United States Patent
Nikitin et al.

(10) Patent No.: US 8,847,170 B2
(45) Date of Patent: Sep. 30, 2014

(54) MEASUREMENT OF FORMATION POROSITY USING A SINGLE GAMMA RAY DETECTOR

(75) Inventors: Anton Nikitin, Houston, TX (US); Alexandr A. Vinokurov, Novosibirsk (RU)

(73) Assignee: Baker Hughes Incorporated, Houston, TX (US)

(*) Notice: Subject to any disclaimer, the term of this patent is extended or adjusted under 35 U.S.C. 154(b) by 81 days.

(21) Appl. No.: 13/527,000

(22) Filed: Jun. 19, 2012

(65) Prior Publication Data

US 2012/0326048 A1     Dec. 27, 2012

Related U.S. Application Data

(60) Provisional application No. 61/500,039, filed on Jun. 22, 2011.

(51) Int. Cl.
    *G01T 1/16*     (2006.01)
    *G01V 5/10*     (2006.01)
    *G01V 5/12*     (2006.01)

(52) U.S. Cl.
    CPC ............... *G01V 5/101* (2013.01); *G01V 5/125* (2013.01)
    USPC ........................................................ 250/393

(58) Field of Classification Search
    CPC ................................... G01V 5/101; G01T 1/16
    USPC ................. 250/393, 269.2, 264, 265, 366
    See application file for complete search history.

(56) References Cited

U.S. PATENT DOCUMENTS

| | | | |
|---|---|---|---|
| 3,413,470 A | | 11/1968 | Allen, Jr. et al. |
| 3,772,513 A | * | 11/1973 | Hall et al. ............... 376/165 |
| 4,122,339 A | | 10/1978 | Smith, Jr. et al. |
| 4,604,522 A | * | 8/1986 | Arnold ................... 250/264 |
| 6,373,066 B1 | | 4/2002 | Penn |
| 7,282,704 B2 | | 10/2007 | Guo |
| 7,365,307 B2 | | 4/2008 | Stoller et al. |
| 7,548,817 B2 | | 6/2009 | Hassan et al. |
| 7,615,741 B2 | | 11/2009 | Jacobi et al. |
| 7,623,968 B2 | | 11/2009 | Griffiths et al. |
| 2010/0019138 A1 | | 1/2010 | Galford et al. |
| 2013/0206972 A1 | * | 8/2013 | Zhou et al. ............ 250/269.4 |

OTHER PUBLICATIONS

Heisig, G., et al., "Downhole Diagnosis of Drilling Dynamics Data Provides New Level Drilling Process Control to Driller," SPE 49206, SPE Annual Technical Conference and Exhibition, New Orleans, LA (Sep. 27-30, 1998).
Ellis, Darwin V., et al.,"Well Logging for Earth Scientists" Springer 2d Edition (2007), pp. 351-382).
Inanc, F., et al., "Physical Basis, Modeling and Interpretation of a New Gas Saturation Measurement for Cased Wells," SPWLA 50th Annual Logging Symposium (Jun. 21-24, 2009).

* cited by examiner

*Primary Examiner* — David Porta
*Assistant Examiner* — Faye Boosalis
(74) *Attorney, Agent, or Firm* — Mossman Kumar & Tyler PC

(57) ABSTRACT

A pulsed neutron source is used in a porosity logging tool with a single gamma ray detector coated with a neutron absorbing material. By using a ratio of the spectral peak associated with hydrogen to a spectral peak associated with the neutron absorbing material, the formation porosity is estimated.

12 Claims, 4 Drawing Sheets

MEASUREMENT OF FORMATION POROSITY USING A SINGLE GAMMA RAY DETECTOR

CROSS-REFERENCE TO RELATED APPLICATION

This application claims priority from U.S. Provisional Patent Application Ser. No. 61/500,039, filed on 22 Jun. 2011, incorporated herein by reference in its entirety.

BACKGROUND OF THE DISCLOSURE

This disclosure relates generally to oil and gas well logging tools. More particularly, this disclosure relates to tools for measuring rock formation porosity through the use of gamma ray signals created when neutrons emitted by a pulsed neutron source interact with the materials surrounding the tool and with the material of the tool itself. This disclosure relates to a neutron porosity tool that uses a single gamma ray detector covered with neutron absorbing material like $B^{10}$ isotope for the porosity measurements.

In petroleum and hydrocarbon production, it may be desirable to know the porosity of the subterranean formation that contains the hydrocarbon reserves. Knowledge of porosity may be used in calculating the oil saturation and thus the volume of oil in-place within the reservoir. Knowledge of accurate porosity values is particularly useful in older oil wells where porosity information derived from open hole porosity logs is either insufficient or nonexistent. This porosity information is useful in determining remaining oil in-place and in determining whether the remaining oil in-place justifies applying enhanced recovery methods. Porosity information is also helpful in identifying up-hole gas zones and differentiating between low porosity liquid and gas.

A variety of tools exists which allow the porosity of the reservoir to be determined. Most of these tools are effective in determining the porosity of the reservoir around the wellbore in which the tool is run. There are devices that work with cased holes as well as uncased holes. A common feature of these prior art tools is the necessity of having at least two neutron detectors. The present disclosure is directed towards a tool in which a single gamma ray detector is used for estimating formation porosity.

SUMMARY OF THE DISCLOSURE

One embodiment of the disclosure is a method of evaluating an earth formation. The method includes: obtaining an indication of a porosity of the earth formation using gamma rays measured by a single gamma ray detector, where the earth formation has been irradiated by a neutron source and the gamma ray detector is coated with a neutron absorbing material.

Another embodiment of the disclosure is an apparatus configured to evaluate a subterranean formation from within a wellbore. The apparatus includes: a pulsed neutron source configured to be conveyed in the wellbore and irradiate the earth formation; a single gamma ray detector coated with a neutron absorbing material and configured to measure gamma rays resulting from the irradiation; and a processor configured to use the measured gamma rays for obtaining an indication of a porosity of the earth formation.

Another embodiment of the disclosure is a non-transitory computer-readable medium product having instructions thereon that when read by a processor cause the processor to execute a method, the method comprising obtaining an indication of a porosity of an earth formation using gamma rays measured by a single gamma ray detector, where the earth formation has been irradiated by a neutron source and the single gamma ray detector is coated with a neutron absorbing material.

BRIEF DESCRIPTION OF THE FIGURES

The present disclosure is best understood with reference to the accompanying figures in which like numerals refer to like elements and in which.

DETAILED DESCRIPTION OF THE DISCLOSURE

Figure 1:
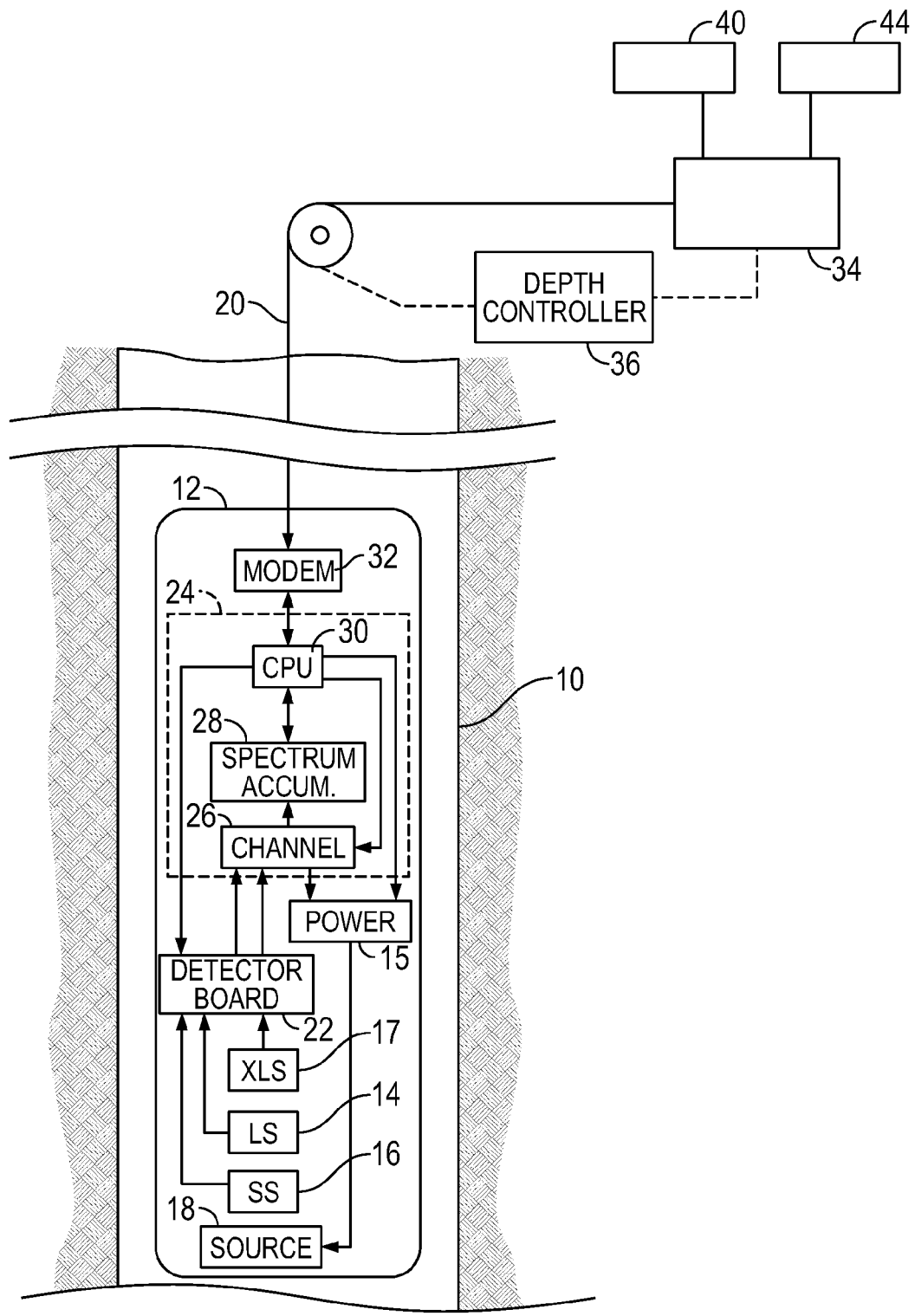
FIG. 1 is an overall schematic diagram of the nuclear well logging system of the present disclosure.

The system shown in FIG. 1 is a system for logging based on the use of pulsed neutron generator according to the present disclosure. Well 10 penetrates the earth's surface and may or may not be cased depending upon the particular well being investigated. Disposed within well 10 is subsurface well logging instrument 12. The system diagramed in FIG. 1 is a microprocessor-based nuclear well logging system using multi-channel scale analysis for determining the timing distributions of the detected gamma rays. In the prior art, well logging instrument 12 includes an extra-long spaced (XLS) detector 17, a long-spaced (LS) detector 14, a short-spaced (SS) detector 16 and pulsed neutron source 18. The principles of the logging will be discussed first with respect to this prior art embodiment. In one embodiment of the present disclosure, as discussed below, only a single detector is used. In the prior art, XLS, LS and SS detectors 17, 14, and 16 are comprised of suitable material such as bismuth-germanate (BGO) crystals or sodium iodide (NaI) coupled to photomultiplier tubes. To protect the detector systems from the high temperatures encountered in boreholes, the detector system may be mounted in a Dewar-type flask. This particular source and flask arrangement is an example only, and should not be considered a limitation. Also, in one embodiment of the disclosure, source 18 comprises a pulsed neutron source using a D-T reaction wherein deuterium ions are accelerated into a tritium target, thereby generating neutrons having energies of approximately 14 MeV. This particular type of source is for exemplary purposes only and not to be construed as a limitation. The filament current and accelerator voltage are supplied to source 18 through power supply 15. Cable 20 suspends instrument 12 in well 10 and contains the required conductors for electrically connecting instrument 12 with the surface apparatus. In the present disclosure, the arrangement of the single detector is discussed further below.

The outputs from XLS, LS and SS detectors 17, 14, and 16 may be coupled to detector board 22, which may amplify these outputs and compares them to an adjustable discriminator level for passage to channel generator 26. Channel generator 26 may be a component of multi-channel scale (MCS) section 24 which further includes spectrum accumulator 28 and central processor unit (CPU) 30. MCS section 24 accumulates spectral data in spectrum accumulator 28 by using a channel number generated by channel generator 26 and associated with a pulse as an address for a memory location. After all of the channels have had their data accumulated, CPU 30 reads the spectrum, or collection of data from all of the channels, and sends the data to modem 32 which is coupled to cable 20 for transmission of the data over a communication link to the surface apparatus. Channel generator 26 also generates synchronization signals which control the pulse frequency of source 18, and further functions of CPU 30 in communicating control commands which define certain operational parameters of instrument 12 including the discriminator levels of detector board 22, and the filament current and accelerator voltage supplied to source 18 by power supply 15.

The surface apparatus may include master controller 34 coupled to cable 20 for recovery of data from instrument 12 and for transmitting command signals to instrument 12. Master controller 34 may include a processor. In some embodiments, the processor may be separate from the master controller 34. The surface apparatus may include depth controller 36 which may be configured to provide signals to master controller 34 indicating the movement of instrument 12 within well 10. The system operator may access the master controller 34 to allow the system operator to provide selected input for the logging operation to be performed by the system. Display unit 40 and mass storage unit 44 are also coupled to master controller 34. The primary purpose of display unit 40 is to provide visual indications of the generated logging data as well as systems operations data. Storage unit 44 is provided for storing logging data generated by the system as well as for retrieval of stored data and system operation programs. A satellite link may be provided to send data and or receive instructions from a remote location.

In a well logging operation such as is illustrated by FIG. 1, master controller 34 initially transmits system operation programs and command signals to be implemented by CPU 30, such programs and signals being related to the particular well logging operation. Instrument 12 is then caused to traverse well 10 in a conventional manner, with source 18 being pulsed in response to synchronization signals from channel generator 26. Typically, source 18 is pulsed at a rate of 1000 bursts/second (1 KHz). This, in turn, causes a burst of high energy neutrons on the order of 14 MeV to be introduced into the surrounding formation to be investigated. This population of high energy neutrons introduced into the formation will cause the generation of gamma rays within the formation which at various times will impinge on XLS, LS and SS detectors 17, 14, and 16. As each gamma ray thus impinges upon the crystal-photomultiplier tube arrangement of the detectors 17, 14, and 16, a voltage pulse having an amplitude related to the energy of the particular gamma ray may be delivered to detector board 22. It will be recalled that detector board 22 amplifies each pulse and compares them to an adjustable discriminator level, typically set at a value corresponding to approximately 100 KeV. If a pulse has an amplitude corresponding to an energy of at least approximately 100 KeV, the voltage pulse is transformed into a digital signal and passed to channel generator 26 of MCS section 24. The high energy neutrons emitted by the source create gamma ray signals through inelastic scattering. Neutrons emitted by the source also interact with nuclei of the surrounding formation through elastic scattering and, as a result, lose energy. When the neutron energy becomes of the order of kT after multiple elastic interactions, such thermalized neutrons may be captured by nuclei of the surrounding material and capture gamma rays can be emitted. The gamma ray spectrum measured by the tool described above between 2 neutron bursts is mainly comprised of gamma rays emitted in capture reactions and is called capture gamma ray spectrum.

In addition, as would be known to those versed in the art, many of the functions of the components described with reference to FIG. 1 may be carried out by a processor. It should also be noted that the system described in FIG. 1 involves conveyance of the logging device 12 into the well 10 by a wireline. However, it is envisaged that the logging device 12 could be part of a measurement while drilling (MWD) bottom hole assembly conveyed into the borehole by a drilling tubular such as a drill string or coiled tubing. In addition, it should be noted that FIG. 1 illustrates a tool in an open hole. The method and apparatus are equally well suited for use in cased holes.

Figure 2:
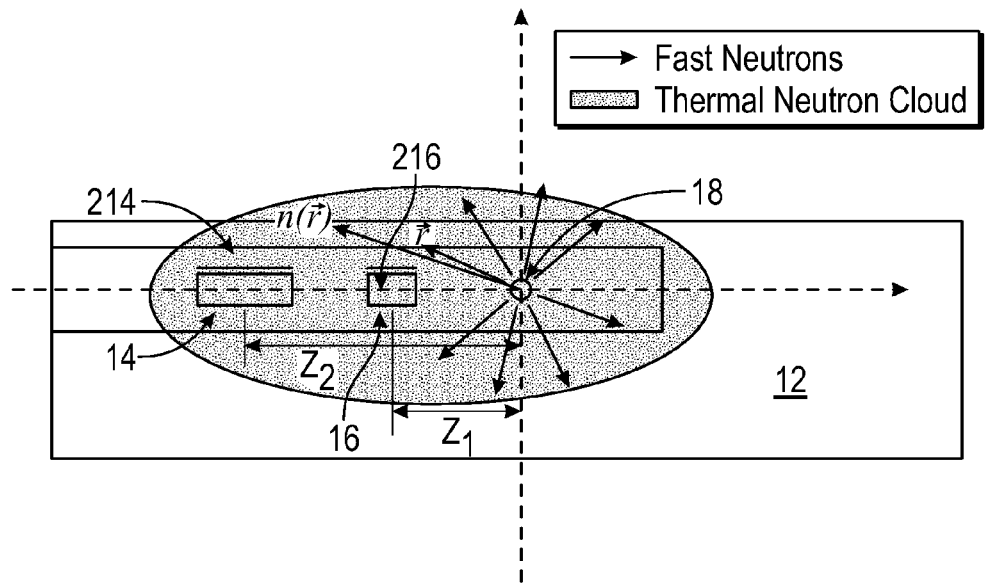
FIG. 2 illustrates a prior art methods for determination of formation porosity using two neutron detectors.

Turning now to FIG. 2, the principles of a prior art device for the porosity measurement are discussed. The device includes a source of fast neutrons 18, which can be either a chemical source of neutrons or pulsed neutron generator. The device has a short spaced (SS) neutron detector 16 at a distance $Z_1$ from the source 18 and a long-spaced (LS) neutron detector 14 at a distance $Z_2$ from the source 18. These detectors 14, 16 perform the measurements of mainly thermal neutron component of neutron flux passing through areas 216 (for SS detector) and 214 (for LS detector) and this component is proportional to the count rate measured by each detector. The ratio of count rates measured by SS and LS detectors is used to determine formation porosity. This ratio R can be described by formula:

$$R = \frac{CR_{SS}}{CR_{LS}} \sim \frac{FTN_{SS}}{FTN_{LS}} \sim \frac{n(Z_1)}{n(Z_2)} = f(\rho), \qquad (1)$$

where
R—count rate ratio;
$CR_{XX}$—count rate;
$FTN_{XX}$—flux of neutrons passing through the detector;
$n(Z_X)$—concentration of thermal neutrons in point $Z_X$; and
$f(\rho)$—function of formation porosity.

Figure 3:
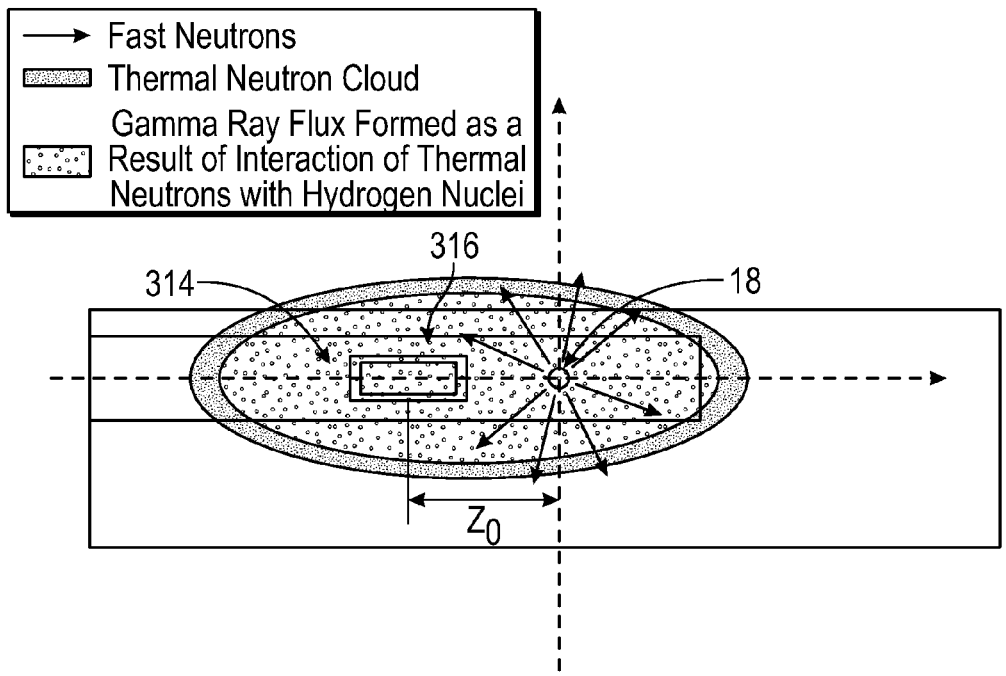
FIG. 3 illustrates an embodiment of the present disclosure in which a single gamma ray detector with a coating of $B^{10}$ is used.

Turning now to FIG. 3, an illustration of the device according to one embodiment of the present disclosure is shown. The tool 12 includes a source of fast neutrons 18 such as a pulsed neutron generator. The gamma ray detector 314 is at a distance $Z_0$ from the source 18. Detector 314 is covered with the $B^{10}$ layer 316 thick enough to absorb more than 99% of thermal neutrons passing through the detector. The Neutron-$B^{10}$ reaction is described by (2);

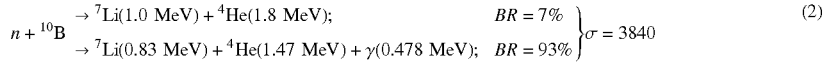

$$n + {}^{10}B \begin{array}{l} \to {}^7Li(1.0 \text{ MeV}) + {}^4He(1.8 \text{ MeV}); \quad BR = 7\% \\ \to {}^7Li(0.83 \text{ MeV}) + {}^4He(1.47 \text{ MeV}) + \gamma(0.478 \text{ MeV}); \quad BR = 93\% \end{array} \bigg\} \sigma = 3840 \qquad (2)$$

where the total value of the reaction cross-section σ is for the thermal neutrons with energy $E_n$=0.025 eV.

The reaction (2) causes the emission of gamma rays with $E_\gamma$=0.478 MeV. As a result, capture gamma ray spectrum measured by the detector 314 of such a tool contains the "boron" peak at ~0.5 MeV which is the superposition of two peaks—the boron peak itself due to gamma rays produced by reaction (2) with energy $E_\gamma$=0.478 MeV and the peak which is due to gamma rays with $E_\gamma$=0.511 MeV generated by positrons born inside of the detector (see FIG. 4). This capture spectrum also contains hydrogen peak at 2.222 MeV (see FIG. 4), which is due to the capture interaction of hydrogen nuclei and thermal neutrons which causes the emission of gamma rays with energy $E_\gamma$=2.222 MeV.

The intensity of boron peak itself, the component of the observed "B" peak which is due to 0.478 MeV gamma rays, is proportional to thermal neutron flux passing through the surface of gamma ray detector covered with $B^{10}$ isotope:

$$I_B = S(E_\gamma = 0.478 \text{ MeV}) \otimes FTN \sim n(Z_0) \qquad (3)$$

where S is gamma ray detector response function. The intensity of observed peak in the spectrum ("B" peak) can be described by:

$$I_{"B"} = I_B + I_{0.511} \qquad (4)$$

where $I_{0.511}$ is the intensity of the component which is due to 0.511 MeV gamma rays. The intensity of this component can be described by:

$$I_{0.511} = S(E_\gamma = 0.511 \text{ MeV}) \otimes \sigma_{pp}(E_\gamma') \otimes \qquad (5)$$
$$\int \gamma(\vec{r}, E_\gamma'')(\delta(E_\gamma' - E_\gamma'')\exp(-\sigma_\gamma(\vec{r})\vec{r}) + CT(E_\gamma'', E_\gamma', \vec{r}))\frac{d^3\vec{r}}{4\pi r^2}$$

where $\gamma(\vec{r},E_\gamma'')$ is the distribution of gamma rays in the tool-borehole-formation (TBF) system formed by the interaction of thermal neutrons of the thermal neutron cloud formed in TBF system by the pulse of fast neutrons emitted by pulsed neutron generator with the material of TBF system;

$\sigma_{pp}(E_\gamma')$ is the probability for gamma ray which reaches the detector with energy $E_\gamma'$ to create electron-positron pair;

$CT(E_\gamma'',E_\gamma',\vec{r}) = \int d\vec{r}' \quad \exp(-\sigma_\gamma(\vec{r}')r')\exp(-\sigma_{Comp}(E_\gamma'' \to E_\gamma', \vec{r}')(\vec{r}-r\vec{r}'))$ is gamma array flux created by Compton scattering in the system; $\sigma_\gamma(\vec{r}')$ is the gamma ray adsorption coefficient of the system; and $\sigma_{Comp}$ is gamma ray Compton scattering coefficient of the system.

For (5) the center of the coordination system coincides with the center of the gamma ray detector.

The intensity of hydrogen peak is described by:

$$I_H = S(E_\gamma = 2.2 \text{ MeV}) \otimes \int \gamma(\vec{r}, E_\gamma = 2.2 \text{ MeV})\exp(-\sigma_\gamma(\vec{r})\vec{r})\frac{d^3\vec{r}}{4\pi r^2} \qquad (6)$$

Here $\gamma(\vec{r},E_\gamma$=2.2 MeV) is the flux of gamma rays with $E_\gamma$=2.2 MeV born in the point $\vec{r}$ due to capture interaction of thermal neutrons with hydrogen nuclei in this point. This parameter is proportional to the concentration of thermal neutrons $n(\vec{r})$ at the same point:

$$\gamma(\vec{r},E_\gamma = 2.2 \text{ MeV}) = \sigma_{capture} n_H(\vec{r}) n(\vec{r}) \qquad (7)$$

where $n_H(\vec{r})$ is the distribution of hydrogen nuclei in TBF system.

To a zero-order approximation, assuming that gamma ray scattering properties of TBF system changes with $\vec{r}$ much slower than $n(\vec{r})$ does, the relative ratio of the intensities of "boron" and hydrogen peaks in the capture gamma ray spectrum measured by tool shown in FIG. 3 can be described as:

$$R_{BtoH} = \frac{I_{"B"}}{I_H} = \frac{An(Z_0) + C}{B \int n(\vec{r}) \frac{d^3\vec{r}}{4\pi r^2}} \qquad (8)$$

where A, B, and C are some constants. Because the distribution of thermal neutrons in TBF system is defined by the formation porosity, the following expression is valid:

$$R_{BtoH} = g(\rho) \qquad (9)$$

where $g(\rho)$—function dependent on formation porosity which could have as parameters such parameters of the TBF system as lithology of formation, borehole diameter, and others. Hence by measuring the capture gamma ray spectrum using tool illustrated in FIG. 3, the formation porosity can be found from the "B" to H peak intensity ratio $R_{BtoH}$.

Figure 4:
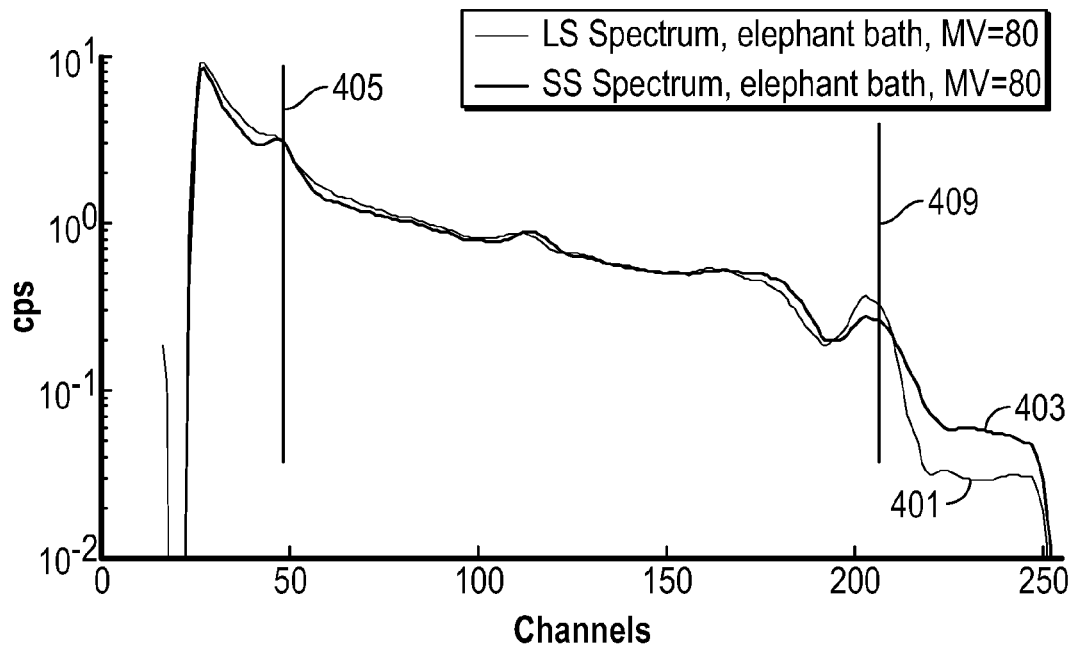
FIG. 4 shows an exemplary capture gamma ray spectrum measured by a SS detector having a $B^{10}$ coating and an LS detector having a $B^{10}$ coating.

Turning now to FIG. 4, capture gamma ray spectra are shown of measurements in a water tank made by a modified device presented in FIG. 1 where gamma ray detectors had a $B^{10}$ coating. The abscissa is the channel number. The curve 401 corresponds to the spectrum measured by LS detector while the curve 403 corresponds to the spectrum measured by the SS detector. 405 indicates the location of the "B" peak at about 0.5 MeV while 409 indicates the H peak at about 2.222 MeV.

Figure 5:
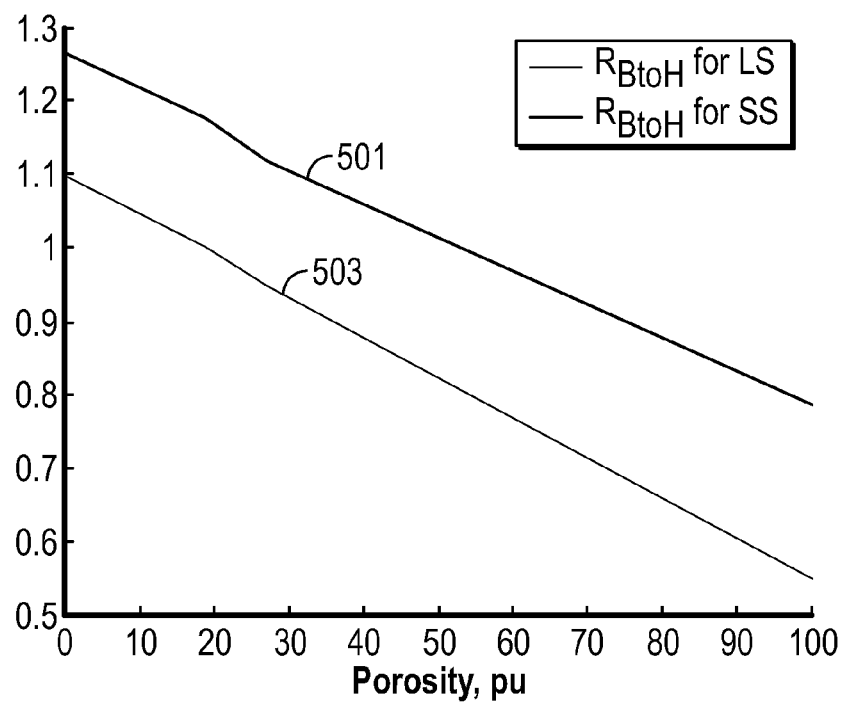
FIG. 5 shows a plot of the ratio $R_{BtoH}$ of the "B" peak intensity to the H peak intensity for limestones of different porosity.

To demonstrate the validity of the method described above, measurements were made in blocks of limestone and sandstone using the tool shown in FIG. 1 with modified detectors used to make the water tank measurements shown in FIG. 4. Shown in FIG. 5 are the ratios $R_{BtoH}$ of the "B" peak intensity to the H peak intensity for limestones of different porosities. The two endpoints (0% and 100%) correspond to a tight limestone and water tank measurements. The intermediate points are for Austin chalk of 27% porosity and an Indiana limestone with 19% porosity. Over the range of porosities to be expected in practice, the curve 501 for the SS measurements and the curve 503 for the LS measurements exhibit a reasonably linear behavior that decreases with the porosity increase.

Figure 6:
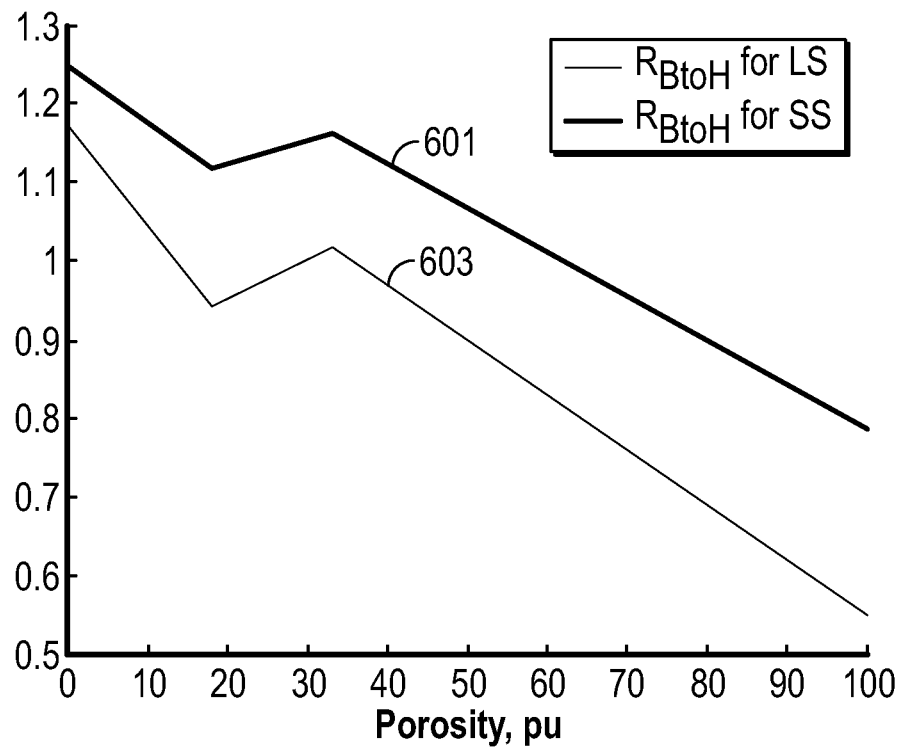
FIG. 6 shows a plot of the ratio $R_{BtoH}$ of the "B" peak intensity to the H peak intensity for sandstones of different porosity.

Similar results have been obtained from measurements in sandstones. Shown in FIG. 6 are the ratios of the "B" peak intensity to the H peak intensity $R_{BtoH}$ for sandstones of different porosities. The two endpoints (0% and 100%) correspond to a tight sandstone and water tank measurements. The intermediate points are for a sandstone of 33% porosity and a sandstone with 18% porosity. Over the range of porosities to be expected in practice, the curve 601 for the SS measurements and the curve 603 for the LS measurements exhibit the presence of a dependence on the porosity that is more complicated than a simple linear dependence.

Intensities of "B" and H peaks were calculated by integrating the spectral intensity in the channel intervals (41;56) (B peak) and (194;222) (H peak) for SS detector and (39;54) (B peak) and (190;215) (H peak) for LS detector and subtracting the background intensity. Background was approximated by the straight line connecting the spectral points at the edges of the corresponding peak intervals. For the data presented in FIGS. 5-6, the borehole diameter was 7⅞ inches.

The experimental results shown in FIGS. 5-6 suggest that the ratio $R_{BtoH}$ of the "B" peak intensity to the H peak intensity can be used to estimate formation porosity using appropriate calibration curves for the formations of different lithologies.

Figure 7:
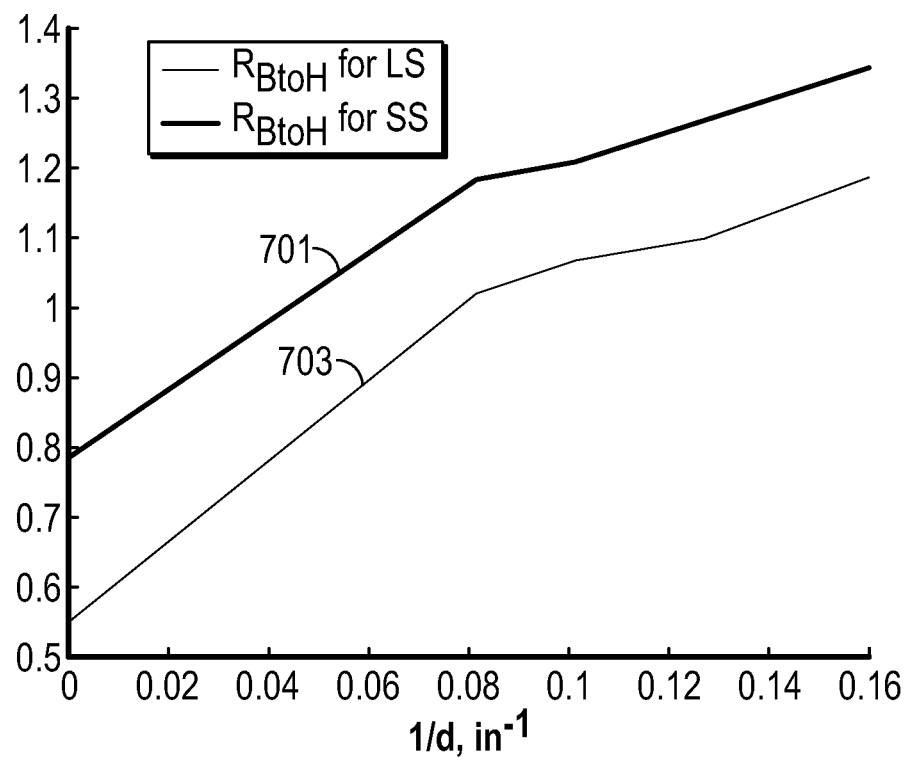
FIG. 7 shows a plot of the ratio $R_{BtoH}$ of "B" peak intensity to the H peak intensity for a tight limestone as a function of borehole diameter.

Turning now to FIG. 7, the ratios $R_{BtoH}$ of "B" peak intensity to the H peak intensity are plotted for a limestone of zero porosity for different borehole diameters where curve 701 is for the SS measurements and curve 703 is for the LS measurements. The abscissa is the reciprocal of the hole diameter in inches. This means that the diameter of the borehole should be included as a parameter into the calibration. Such calibration for a range of borehole sizes, lithology and porosity is a routine matter for wireline applications. For MWD operations, the borehole diameter can be measured during drilling operations such as using the method and apparatus disclosed in U.S. Pat. No. 7,548,817 to Hassan. As disclosed in Hassan, caliper measurements made during rotation of a bottomhole assembly are processed to estimate the location of the bottomhole assembly, and size and shape of the borehole. A piecewise elliptical fitting procedure may be used. These estimates may be used to correct measurements made by a standoff-sensitive formation evaluation sensor such as a neutron porosity tool. The calibration that may be used maybe a table lookup or maybe derived from results of a regression.

The processing of the measurements made in wireline applications may be done by a surface processor 34, by a downhole processor, or at a remote location. The data acquisition may be controlled at least in part by the downhole electronics. Implicit in the control and processing of the data is the use of a computer program on a suitable machine readable medium that enables the processors to perform the control and processing. The machine readable medium may include ROMs, EPROMs, EEPROMs, Flash Memories and Optical disks.

While the foregoing disclosure is directed to the specific embodiments of the disclosure, various modifications will be apparent to those skilled in the art. It is intended that all such variations within the scope and spirit of the appended claims be embraced by the foregoing disclosure.

What is claimed is:

1. A method of evaluating an earth formation, the method comprising:
    obtaining an indication of a porosity of the earth formation using gamma rays measured by a single gamma ray detector, where the earth formation has been irradiated by a neutron source and the single gamma ray detector is coated with a neutron absorbing material.

2. The method of claim 1 further comprising using, for the neutron absorbing material, $B^{10}$.

3. The method of claim 1 wherein using the measured gamma rays further comprises:
    (i) estimating a spectrum of the measured gamma rays;
    (ii) using a first peak associated with the neutron absorbing material and using a second peak associated with hydrogen nuclei.

4. The method of claim 1 further comprising using results of a plurality of calibration measurements.

5. The method of claim 4 further comprising making the plurality of calibration measurements over a plurality of lithologies, a plurality of porosities, and a plurality of well bore diameters.

6. An apparatus configured to evaluate a subterranean formation from within a wellbore, comprising:
    (a) a pulsed neutron source configured to be conveyed in the wellbore and irradiate the earth formation;
    (b) a single gamma ray detector coated with a neutron absorbing material and configured to measure gamma rays resulting from the irradiation; and
    (c) a processor configured to:
        use the measured gamma rays for obtaining an indication of a porosity of the earth formation.

7. The apparatus of claim 6 wherein the neutron absorbing material further comprises $B^{10}$.

8. The apparatus of claim 6 wherein the processor is further configured to use the measured gamma rays by:
    (i) estimating a spectrum of the measured gamma rays;
    (ii) using a first peak associated with the neutron absorbing material and using a second peak associated with hydrogen nuclei.

9. The apparatus of claim 6 wherein the processor is further configured to use results of a plurality of calibration measurements.

10. The apparatus of claim 9 wherein the plurality of calibration measurements are obtained over a plurality of lithologies, a plurality of porosities, and a plurality of well bore diameters.

11. A non-transitory computer-readable medium product having thereon instructions that when read by a processor cause the processor to execute a method, the method comprising:
    obtaining an indication of a porosity of an earth formation using gamma rays measured by a single gamma ray detector, where the earth formation has been irradiated by a neutron source and the single gamma ray detector is coated with a neutron absorbing material.

12. The non-transitory computer-readable medium product of claim 11 comprising at least one of:
    (i) a ROM, (ii) an EPROM, (iii) an EEPROM, (iv) a Flash Memory, and (v) an optical disk.

\* \* \* \* \*